US007654901B2

(12) United States Patent
Breving

(10) Patent No.: US 7,654,901 B2
(45) Date of Patent: *Feb. 2, 2010

(54) VIDEO GAME SYSTEM USING BIO-FEEDBACK DEVICES

(76) Inventor: Joel S. Breving, 53 Boerum Pl., Apt. 5E, Brooklyn, NY (US) 11201

( * ) Notice: Subject to any disclaimer, the term of this patent is extended or adjusted under 35 U.S.C. 154(b) by 203 days.

This patent is subject to a terminal disclaimer.

(21) Appl. No.: 11/745,772

(22) Filed: May 8, 2007

(65) Prior Publication Data

US 2007/0207858 A1    Sep. 6, 2007

Related U.S. Application Data

(60) Continuation-in-part of application No. 10/878,704, filed on Jun. 28, 2004, which is a division of application No. 10/119,797, filed on Apr. 10, 2002, now abandoned.

(51) Int. Cl.
*A63F 9/24* (2006.01)
*A61B 5/00* (2006.01)

(52) U.S. Cl. .......................................... 463/37

(58) Field of Classification Search ....................... None
See application file for complete search history.

(56) References Cited

U.S. PATENT DOCUMENTS

| | | | | | |
|---|---|---|---|---|---|
| 4,683,891 | A | * | 8/1987 | Cornellier et al. | 600/301 |
| 5,447,166 | A | * | 9/1995 | Gevins | 600/544 |
| 5,676,138 | A | * | 10/1997 | Zawilinski | 600/301 |
| 6,190,314 | B1 | * | 2/2001 | Ark et al. | 600/300 |
| 6,928,329 | B1 | * | 8/2005 | Giaimo et al. | 700/94 |

* cited by examiner

*Primary Examiner*—Mark Sager
(74) *Attorney, Agent, or Firm*—Dinsmore & Shohl LLP

(57) ABSTRACT

A video game system using one or more bio-feedback devices for the monitor and transmission of physiological data of a participant of the video game system to the video game system where the data, along with conventional controller data is incorporated into game play provided by software through the video game system. A headset electrically coupled to a video game system, the headset including one or more bio-feedback devices for transmitting participant physiological data to the video game system for real-time incorporation into game play.

21 Claims, 19 Drawing Sheets

VIDEO GAME SYSTEM USING BIO-FEEDBACK DEVICES

CROSS-REFERENCE TO RELATED APPLICATIONS

This application claims the benefit of U.S. patent application Ser. No. 10/878,704, filed Jun. 28, 2004 which is a divisional of U.S. patent application Ser. No. 10/119,797, filed Apr. 10, 2002, abandoned. The entire disclosure of U.S. patent application Ser. No. 10/878,704 is hereby incorporated by reference.

TECHNICAL FIELD

Embodiments of the present invention relate generally to a video game system using bio-feedback devices for the real-time incorporation of physiological data of a participant of the video game system into game play. Further embodiments of the present invention generally relate to a headset and a video game controller that comprise one or more bio-feedback devices, wherein the headset and the controller are electrically coupled to the video game system.

BACKGROUND

The virtual explosion of technical advances in microelectronics, digital computers, and software have changed and continue to change the face of modern society. In fact, these technological advances have become so important and pervasive that this explosion is sometimes referred to as "the information revolution." Through telephone lines, networks, satellites, and other wireless communications and the like, information and resources are ever increasingly being accessed and shared.

The present invention is related to the field of video games that allow for a broader range of interaction between the participant and the game. Current video game systems have failed to, on an economical basis, provide information regarding the physiological state of the human participant and respond to this information during the actual progression of the game. Various bio-feedback measuring devices have been invented during the past century.

The idea of acquiring knowledge of a person's vascular physiology by utilizing diffraction and refraction of infrared light has been around for a long time. In 1938, Hertzman used a photoelectric plethysmograph to study blood supply to various tissues of the body. The practical invention of this technology was significantly advanced in the mid-1980s when Wesseling and Settles, et al. invented the FINAPRES which utilized photo-plethysmography and a finger pressure cuff to measure the arterial pressure of the digits. The Finapres allows for non-invasive blood pressure measurement, but has limited usefulness in medical inventions because the method consistently underestimates mean arterial blood pressure. However, in a video game system, the required accuracy of the measurements is greatly reduced. Today, photoplethysmography can be utilized to measure blood volume pulse revealing a rough estimate of the degree of vasodilation/vasoconstriction of a tissue. By varying the wavelength of the light source used, different parts of the vascular tree can be examined (small arteries 950 nm vs. arterioles 560 nm).

Another bio-feedback device was discovered around 1900 when Deprez-D' Arsonvals discovered the galvanometer. He discovered that when a person perspires, the skin is able to conduct electricity more easily. Deprez-D' Arsonvals measured the change in resistance that resulted from the current passed between two electrodes. In 1907, Carl Jung used a galvanometer to measure skin resistance under stressful situations. Galvanometers have been included in polygraphs invented by Keeler as early as 1925 as one means of measuring autonomic arousal. Near the end of the 20th century, Gettes, et al. proposed four silver electrodes for the simultaneous measurement of skin resistance and heart rate. Various galvanometers are known to one skilled in the art.

Another bio-feedback device is a thermocouple. A thermocouple comprises two pieces of dissimilar metal in close contact, between which there is an electrical potential field that varies as a function of temperature. An example of an early developed thermocouple consisted of two iron and constantan wires wrapped around each other. Later thermocouples were improved using copper and constantan wire as described by Grucza et al. Thermocouples can also be utilized to measure respiratory rate. Cyna et al. discloses the ability to monitor respiratory rate and the expiratory to inspiratory ratio utilizing a thermocouple comprising polarized polyvinylidine fluoride strips.

Another bio-feedback device is an electroencephalogram (EEG). The EEG is a frequently used diagnostic tool in the detection of seizure disorders. Specifically, the EEG detects fluctuating neuronal membrane potentials, or EEG waves, in subject organisms. Richard Carlton first discovered these neuronal membrane potentials while using a galvanometer in studying rabbits and monkeys. Later, Hans Berger utilized a double core galvanometer and an oscillograph to aid in the detection of EEG waves. J. F. Toennies of the Berlin Institute and Brian Matthews of Great Britain are credited as co-inventors of an amplifier that is a crucial component of EEGs used in health care settings today. Through these and other advances in EEG technology, EEG waves are now categorized by width and frequency. Different activities of the brain generate various EEG waves.

The field of bio-feedback started in the 1970s and typically consisted of patients being exposed to their physiological state, such as a pulse or peripheral skin temperature measurement and just by the mere fact of being made aware to this knowledge, the patient was believed to be able to gain control over their physiological state. This is the most basic definition of bio-feedback. Today, most technology based on this original concept can be considered biofeed-forward. The patient is given instructions or suggestions on how to control his physiological state and by this indirect method, the patient can gain control over his peripheral skin temperature or pulse.

Currently, there is a small sect of systems that combine bio-feedback & video game technology. Thought Technology developed the PRO COMP+ System that can be used in conjunction with BIOGRAPH Software to allow clinicians to carefully monitor various modalities of physiological variables while performing tasks on computer. In one game by Thought Technology, the speed of a race car can be altered by the participant's ability to change perspiration monitored by a galvanometer. The J & J I-330 bio-feedback system has a "catching game" that allows participants to control a basket to catch eggs by altering their muscle tension. BOS offers a children's game "Space Lander" that allows participants to land a spacecraft by altering their electromyogram (EMG) signals. In another game designed by SRS Orion Systems, the "Tortoise and Hare" the participant can send the hare onto victory by controlling their skin temperature or muscle tension.

The prior bio-feedback systems typically have one or more of the following disadvantages:

(A) the monitoring technology is bulky, cumbersome and bothersome to participants;

(B) these systems only monitor a specific array of physiological variables;

(C) the software used with these systems are not compatible with current video game systems;

(D) the hardware used with these systems are not compatible with current video games systems;

(E) the software used with these systems is limited;

(F) limited therapeutic use can be raised because it addresses one or two physiological variables;

(G) because of the simplicity of the system, games are geared typically towards a restricted age group of children; and (H) physiological signals are not appropriately formatted so that they are directly relayed to the software of current day video game systems.

With ever-increasing advances in the "technical revolution," there is a need to improve the quality and efficiencies of interactive systems and controls for transferring bio-feedback information from human participants to video game systems. Embodiments of the present invention provide a unique way to facilitate such transfer and interaction between the participant and the video game system.

Bio-feedback currently is used as treatment for a multitude of medicinal illnesses including headaches, anxiety, sleep disorders, attention-deficit hyperactivity disorders, seizures, asthma, and learning disorders. Unfortunately, treatment has been constrained by the limited capability of current bio-feedback technology. Embodiments of the present invention synergistically enhances treatment possibilities by developing a system that improves the quality and efficiency of bio-feedback and incorporating that technology into current day video game systems and related technology. Embodiments of the present invention provide unique ways to facilitate the interaction between the participant and the video game system, opening up endless possibilities.

SUMMARY

To achieve the foregoing, one embodiment of the present invention generally relates to a headset for use with a video game system. The headset comprises one or more bio-feedback devices for transmitting to the video game system physiological data of a participant thereof, wherein the bio-feedback devices comprise at least one of an electroencephalogram, a galvanometer, or a thermocouple. Further, the headset comprises a communication link for electrically coupling the headset and the video game system and conductive wiring for electrically coupling the bio-feedback devices with the communication link.

To further achieve the foregoing, another embodiment of the present invention generally relates to a video game system comprising a control deck; a headset for transmitting physiological data of a participant of the video game system, wherein the headset is electrically coupled with the control deck; and a video game controller for transmitting conventional controller data inputted by the participant and physiological data of the participant. This controller is electrically coupled with the control deck.

To further achieve the foregoing, another embodiment of the present generally relates to a video game system comprising: a video game processor; software; a microprocessor electrically coupled with the video game processor; and one or more bio-feedback devices electrically coupled with the microprocessor. The bio-feedback devices are incorporated into a headset or a video game controller, or both, and transmit data from at least two distinct data types. The data types comprise physiological data from a participant of the video game system and conventional controller data inputted by the participant. The microprocessor comprises executable instructions for determining a ""$z$"" value that represents the number of standard deviations the physiological data is away from a calculated mean of the physiological data.

To further achieve the foregoing, yet another embodiment of the present invention generally relates to a handheld video game system comprising: a shell, a video display, a game port, a processor, and one or more bio-feedback devices. The bio-feedback devices are for transmitting to the processor physiological data of a participant of the handheld video game system. The bio-feedback devices are incorporated into the shell of the handheld video game system and into a headset electrically coupled with the handheld video game system.

To further achieve the foregoing, yet another embodiment of the present invention generally relates to a method of providing physiological data of a participant of a video game system to a software input module of the video game system. The method comprises: a) receiving unprocessed physiological data through a bio-feedback device electrically coupled with the video gaming system, wherein the bio-feedback device transmits the data to the video game system; b) transforming the unprocessed physiological data from an analog form to a digital form utilizing an analog to digital converter; c) collecting the digital form of the physiological data on a shift register, wherein the physiological data is collected serially; d) converting the serial physiological data into a parallel form; e) delivering the parallel form of the physiological data to a data bus; f) transferring the parallel physiological data on the parallel data bus to a microprocessor; g) relaying the parallel physiological data to a ROM unit, wherein the ROM unit stores the parallel physiological data; h) accessing the ROM unit utilizing a RAM unit to perform pre-defined calculations of the parallel physiological data; i) calculating a ""$z$"" value for the parallel physiological data utilizing a mean and standard deviation of the parallel physiological data; j) transferring the ""$z$"" value to a shift register in a serial manner; k) converting the serial ""$z$"" value to a parallel form of the ""$z$"" value; l) transferring the parallel form ""$z$"" value to a microprocessor; and m) relaying the parallel form ""$z$"" value from the microprocessor to the software input module.

Other embodiments and novel features of the present invention will become apparent to those skilled in the art from the following detailed description, which is simply, by way of illustration, various modes contemplated for carrying out the invention. As will be realized, the invention is capable of other embodiments not described herein, all without departing from the invention. Accordingly, the drawings and descriptions are illustrative in nature and not restrictive.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION

Embodiments of the present invention provide novel systems and methods for the interactive collection of bio-feedback information relating to participants interacting with video game systems. The present invention also provides novel apparatuses and methods for transferring information relating to bio-feedback of participants of video games to video game systems. Reference will now be made in detail to various embodiments that are illustrated in the accompanying drawings, wherein like numerals indicate similar elements throughout the views.

Figure 1:
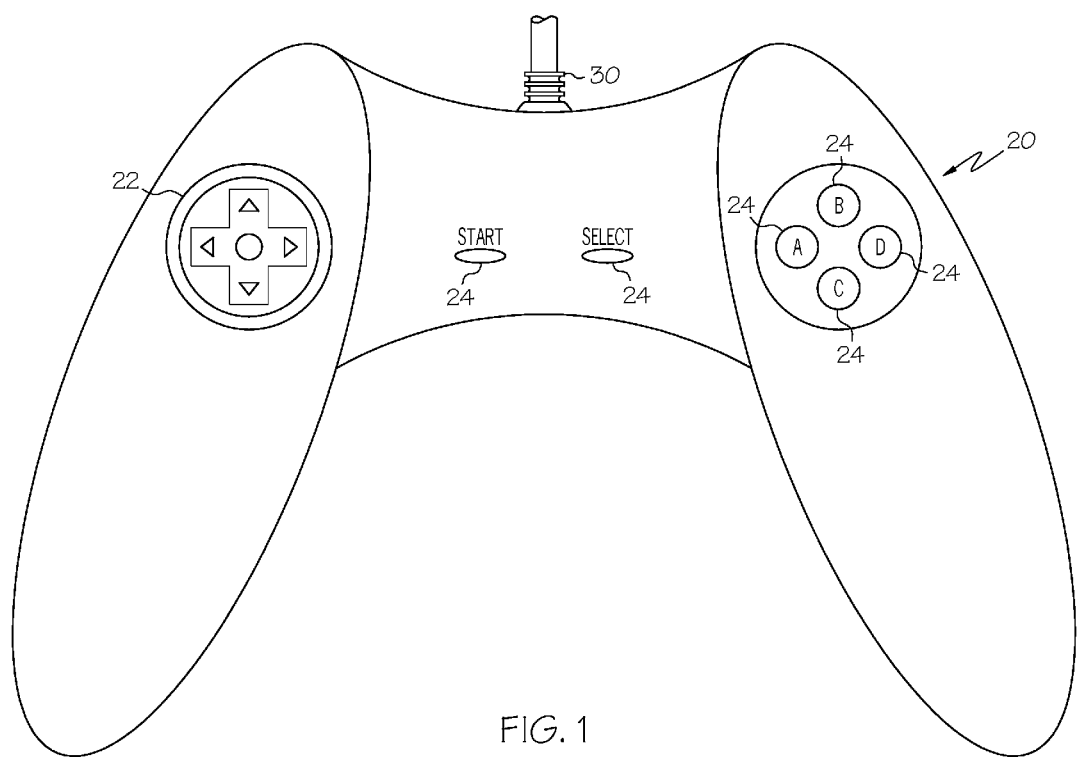
FIG. 1 illustrates a top view of an embodiment of a game controller.

One embodiment of the present invention is illustrated in FIG. 1, which depicts a video game controller 20 for collecting and transmitting physiological data of a participant of the video game system. In one embodiment, the video game controller 20 comprises a motion controller 22, one or more selection buttons 24, and a communication link 30 that can be connected to the video game system. The motion controller 22 allows a participant to manipulate and move items for a video game. The selection buttons 24 allow a participant to choose different options offered when playing a video game. In addition, the video game controller 20 (as depicted in FIG. 2), further includes one or more components, such as a photoelectric plethysmography 35, a galvanometer 40, or a thermocouple 50. In one embodiment, the video game controller 20, further comprises a processor 60. The processor 60, for example, may have a set of executable instructions such as in the form of software, routines, programs, algorithms, code and the like, which would inter alia, measure a participant's bio-feedback at any given time.

The video game controller 20 may be electrically coupled with the video game system via the communication link 30. As used herein, "electrically coupled" means to be in electrically powered communication such that data or other information may be transmitted and exchanged between the components in communication. This coupling may be achieved with hardwired or wireless technology. For example, but not by way of limitation, the communication link 30 may be a token ring, ethernet, telephone modem connection, radio or microwave connection, parallel cables, serial cables, telephone lines, universal serial bus "USB", Firewire, Bluetooth, fiber optics, infrared "IR", radio frequency "RF", or combinations thereof.

Figure 3A:
FIG. 3A illustrates a side view of an embodiment of a finger pressure cuff of a game controller.
Figure 3B:
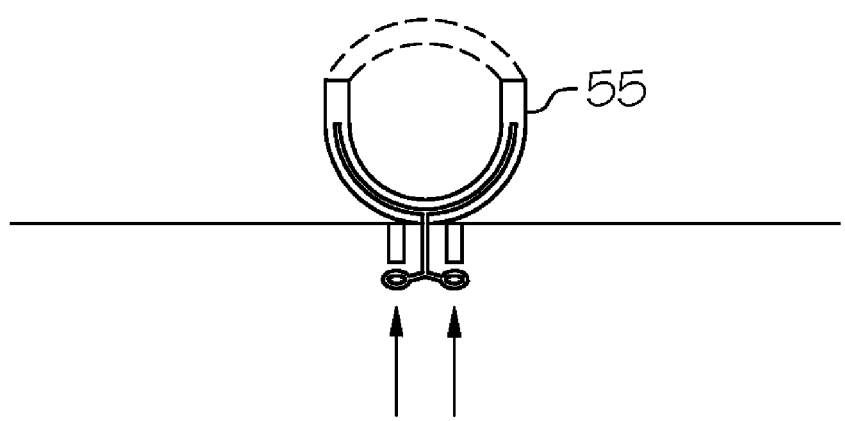
FIG. 3B illustrates a cross-sectional view of an embodiment of a finger pressure cuff of a game controller.
Figure 4:
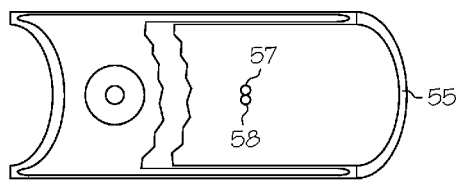
FIG. 4 illustrates a bottom cross-sectional view of an embodiment of a finger pressure cuff of a game controller.

In accordance with another embodiment, depicted in FIG. 2, the video game controller 20 further comprises at least one finger pressure cuff 55. The finger pressure cuff 55 may be configured to allow insertion of a digit (human finger) into at least a portion of the finger pressure cuff 55. An exemplary view of the finger pressure cuff 55 is depicted in FIGS. 3A and 3B. Once a digit is inserted into the finger pressure cuff 55, compressed air inflates an inflatable bladder to create a pressure change on the inserted digit in the finger pressure cuff 55. As depicted in FIG. 4, the inflated bladder presses the tissue of the digit against the photodiode 57 and LED 58 allowing the two to function as a photoelectric plethysmography by capturing reflected infrared light from the LED 58 at the photodiode 58.

In accordance with another embodiment, an LED and photodiode are present without a pressure cuff. In this embodiment, blood volume pulse may be obtained by low pass filtering of the signal (to eliminate noise) and high pass filtering (eliminate continuous component). A LED/photodiode can also be used to measure heart rate. The signal is first high pass filtered to remove high frequency elements and then amplified by a three stage operational amplifier. Respiration can also be obtained from fluctuations of the signal from baseline due to pulse paradoxes or baseline changes in diastolic and systolic blood pressure due to respiration.

Figures 2A, 2B:
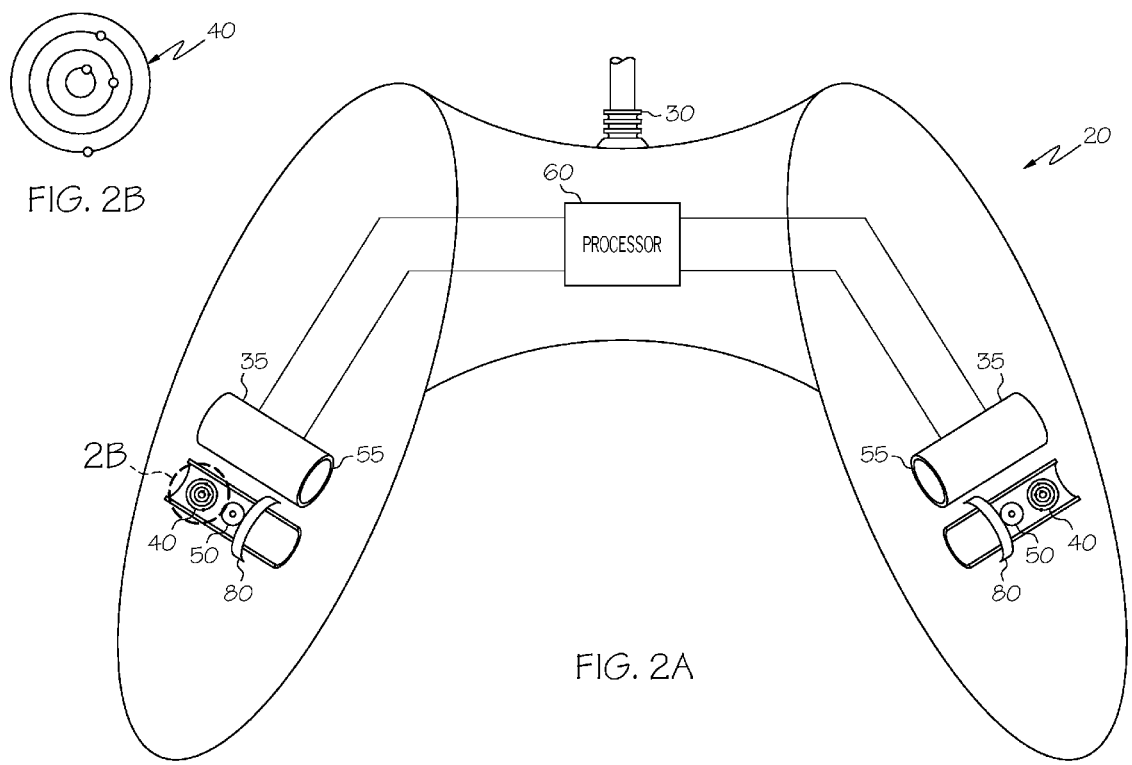
FIG. 2A illustrates a bottom view of an embodiment of the game controller of FIG. 1.
FIG. 2B illustrates an embodiment of a galvanometer positioned on the bottom of a game controller.

In accordance with another embodiment, the video game controller 20 further comprises at least one digit retention ring 80 located adjacent to a galvanometer 40 and thermocouple 50, as depicted in FIG. 2. The digit retention ring 80 is configured to allow the insertion of a digit through at least a portion of the digit retention ring 80 and places the digit in communication with the thermocouple 50 and galvanometer 40. The galvanometer 40 is configured to measure a change in resistance across two electrodes in physical communication with a digit. The galvanometer 40 electrodes measure general skin conductivity of the digit. For example, skin conductivity is altered due to perspiration by the participant. Thus, changes in the conductivity of a galvanometer electrode can be interpreted as changes in perspiration by the processor 60. These changes in perspiration can then be communicated to the video game system through the communication link 30. In one exemplary embodiment, utilizing four silver electrodes and two or more wires, the voltage can be measured to monitor for changes in skin conductivity and allow a one lead ECG, as shown in FIG. 2B. One skilled in the art will appreciate that any conventional galvanometer could be used.

In another exemplary embodiment, a game controller comprises multiple pulse-pressure detectors (photoelectric plethysmography). The participant, after grasping the controller, may be instructed to insert one of their digits, usually their middle finger, into at least one of the pulse-pressure detectors finger pressure cuffs. In one exemplary embodiment, at the proximal end of the finger pressure cuff are two wires which run lengthwise along the cuff into the controller. The cuff is attached to the controller by flexible plastic that is reinforced and continuous with the bladder inside the cuff. One skilled in the art will appreciate that a multitude of flexible materials may be utilized to form the inflatable bladder and the finger pressure cuff. At the end of one of the wires running lengthwise along the cuff is an LED probe that emits infrared light into the tissue of the digit. Part of the light is reflected back to a photodiode connected to the other wire running lengthwise along the cuff, and the reflected light may be substantially filtered and converted to an electrical signal that is transmitted back to the processor and ultimately to the video game system through the communication link. The finger pressure cuff can be adjusted to maintain a continuous blood volume in the tissue of the digit through a servo-control mechanism. The pressure needed to maintain a transmural pressure of approximately "0" is known as the pulse pressure. Such a device is manufactured by Finapress as well as Ohmeda Monitoring Systems and is known to one skilled in the art. This information may be useful to programmers who add custom features to the software invention.

In accordance with yet another embodiment, the game controller 20 comprises a thermocouple 50, as shown in FIG. 2A. The thermocouple 50 is configured to measure changes in temperature of the tissue of the digits. Conventional thermocouples known to one skilled in the art may be utilized for measuring the temperature of the digits. Exemplary thermocouples include K type thermocouple "alumuel-chromel" by Omega Engineering and J, K, T, E thermocouples from Io Tech. Thermistors typically give a more imprecise measurement of temperature but can also be utilized on the game controllers 20. Yellow Springs manufactures a thermistor that would be suitable.

Figure 5:
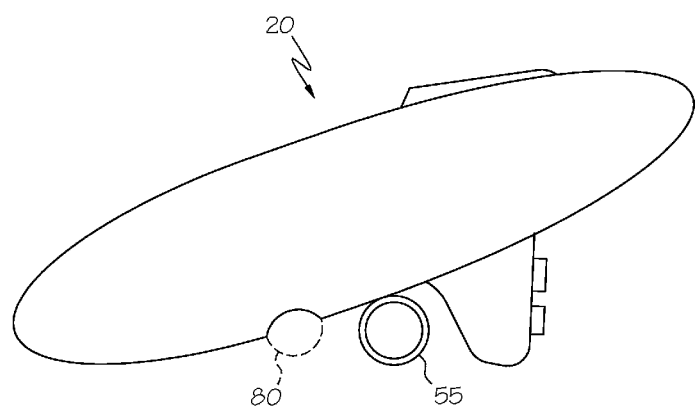
FIG. 5 illustrates a side view of an embodiment of a game controller.

FIG. 5 is an exemplary side view of the video game controller 20 in which the finger pressure cuff 55 and digit retention ring 80 are shown adjacent to each other in an exemplary layout.

The game controller body and other conventional aspects may be constructed from materials known to one skilled in the art. For example, the game controller body may be constructed from polycarbonate, polystyrene, polyvinyl chloride, and the like.

Figure 6A:
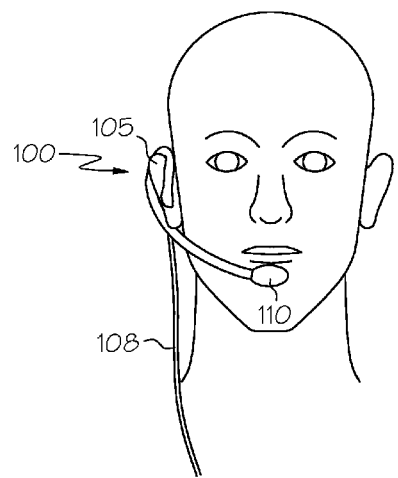
FIG. 6A illustrates an embodiment of a bio-feedback ear piece.
Figure 6B:
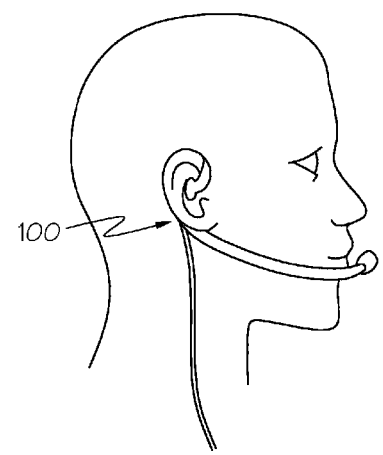
FIG. 6B illustrates a side view of an embodiment of a bio-feedback ear piece.
Figure 7A:
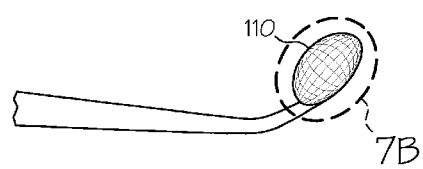
FIG. 7A illustrates a close-up view of an embodiment of a respiratory voice-sensor of a bio-feedback ear piece.
Figure 7B:
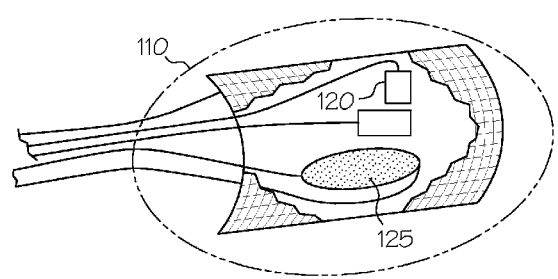
FIG. 7B illustrates a close-up view of an embodiment of a microphone sensor and an embodiment of a thermocouple of a bio-feedback ear piece.
Figure 7C:
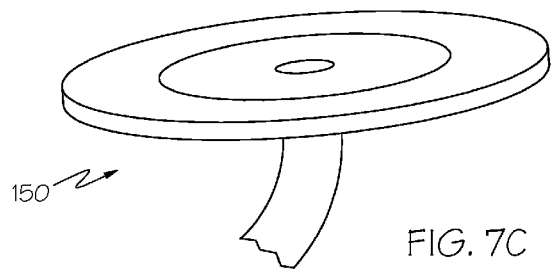
FIG. 7C illustrates a close-up view of an embodiment of a bio-feedback ear piece.

Another embodiment of the present invention, depicted in FIG. 6, is a bio-feedback ear piece 100 for a video game system. The bio-feedback ear piece 100 comprises a speaker 105, a communication link 108 and a respiratory voice-sensor 110. The speaker 105 and the respiratory voice sensor 110 are electrically coupled with the communication link 108. As shown in this exemplary embodiment, the respiratory voice sensor 110 comprises a polyvinylidine fluoride thermocouple 120. It measures voltage changes between the two layers of the thermocouple 120 that arises from the temperature differences between inhaled and exhaled air. This signal can then be processed with the processor 60 into waveform to give a snapshot of the participant's inspiration/expiration rate. The ear piece 100 further comprises a microphone sensor 125 located adjacent to the thermocouple 120. Thermocouple 120 and microphone sensor 125 are located at the distal end of the ear piece 100. In an embodiment, the ear piece 100 is made of material such as a bendable metal or polymer so the microphone sensor 125 and thermocouple 120 may be placed directly in front of the mouth of a human in order to better detect respirations and communication from the participant. In an alternative embodiment, capnography or a non-invasive infrared $CO_2$ measuring and recording apparatus could be used to reveal information about respiratory rate. The proximal end of the ear piece 100 comprises a speaker 105, through which the video game system may play audio or instructions for the participant.

Figure 18A:
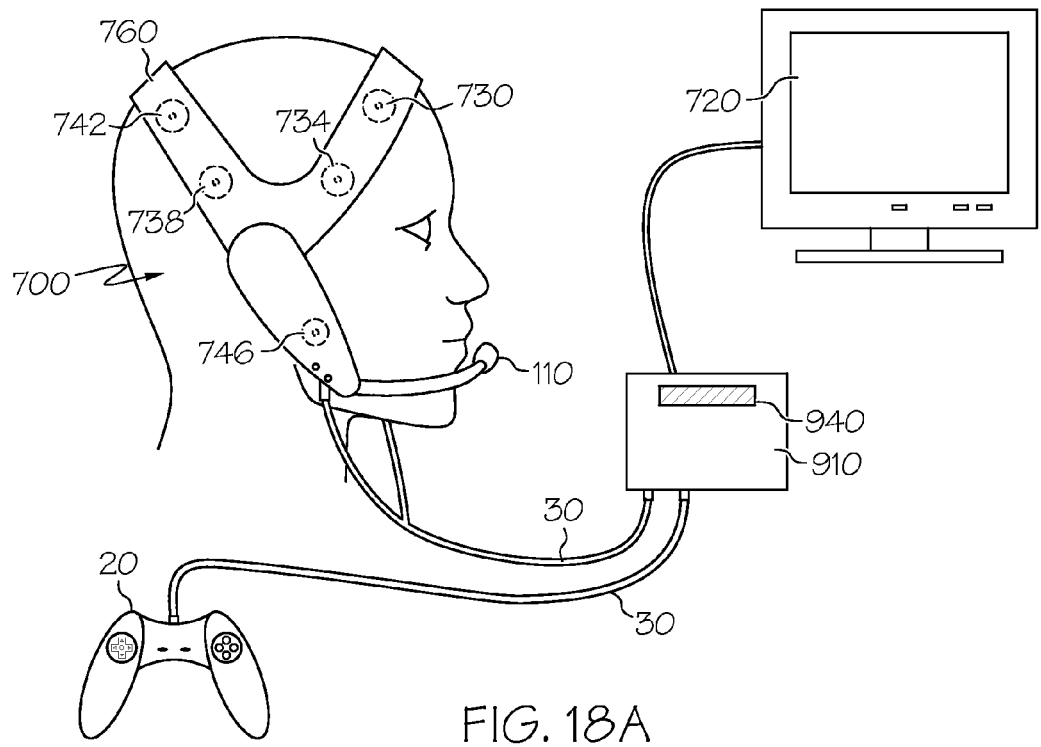
FIG. 18A illustrates an embodiment of a client server network.

FIGS. 18A-21 illustrate an embodiment of a headset 700 for transmitting to a video game system physiological data of a participant thereof. FIG. 18A depicts one embodiment of a video game system. More particularly, FIG. 18A illustrates a headset 700 worn on the head of the participant and a game controller 20, both electrically coupled through respective communication links 30 to a control deck 910 of the video game system, which is electrically coupled to a display device (e.g., a monitor 720). The headset 700 generally comprises one or more bio-feedback devices, such as those represented by references 110, 730, 732, 734, 736, 738, 740, 742, 744, 746, and 748, for transmitting to the video game system physiological data of the participant. These bio-feedback devices generally comprise at least one of an EEG electrode, a galvanometer, or a thermocouple. The headset 700 generally further comprises a communication link 30 for electrically coupling the headset 700 and the video game system and conductive wiring 712, which can be seen more clearly in FIG. 20) for electrically coupling the bio-feedback devices with the communication link 30.

The bio-feedback capabilities of the galvanometer and the thermocouple, as applied to the headset 700, are identical to those described above with respect to the controller and the ear piece. The headset 700, however, has the added capability of monitoring EEG waves of the participant. More particularly, one or more EEG electrodes are configured to measure the aggregate electrical activities of surface cortical neurons and in turn monitor widths and frequencies of EEG waves of a participant of the video game system. The participant's EEG waves are likely to adjust according to game play. As such, the monitoring the EEG waves and their transmittance to the video game system by the headset 700 serves as another approach to incorporating the participant's physiological data into game play of the software operated on the video game system.

Figure 20:
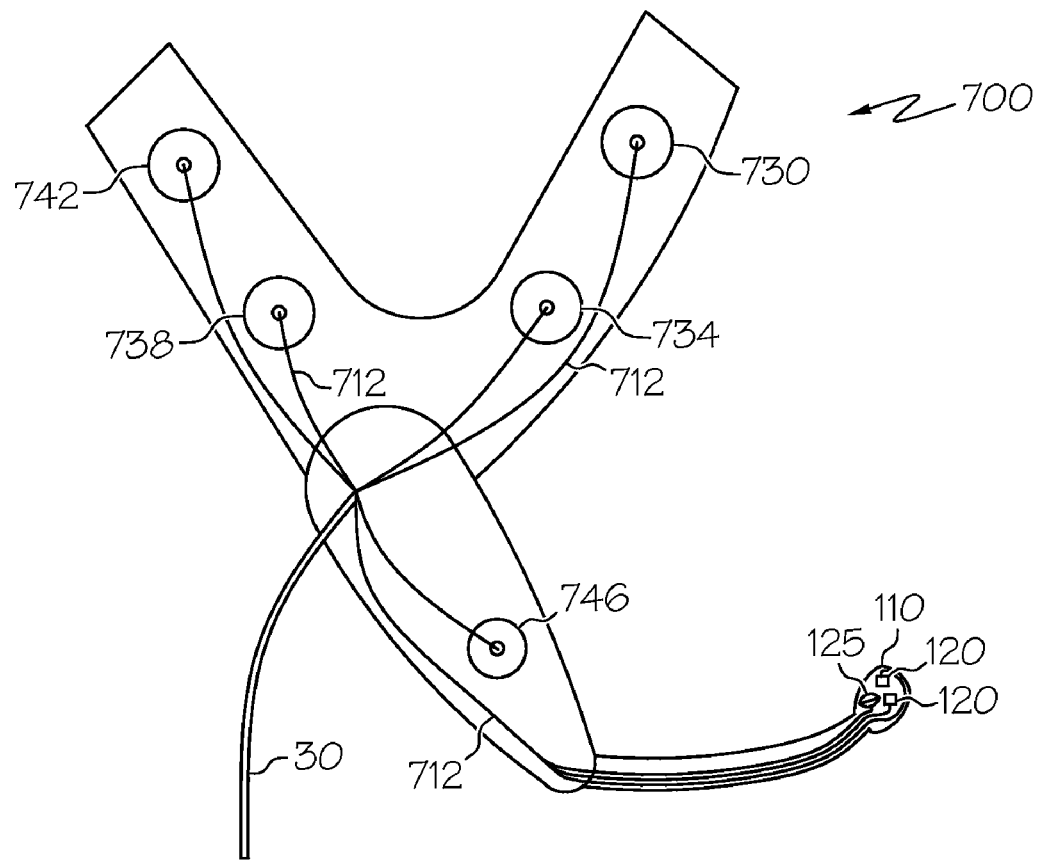
FIG. 20 illustrates a side cross-sectional view of an embodiment of a bio-feedback headset.

The bio-feedback devices of the headset 700 generally are exposed on the interior surface of the headset 700 only such that the devices may be in physical communication with the skin of the participant. Such physical communication often is necessary for the monitoring and transmitting of physiological data to the video game system. The bio-feedback devices are visible on the exterior surface 760 of the headset 700 in FIGS. 18A, 18B, and 21 for illustrative purposes only. FIG. 20 depicts a cross-sectional side view of the headset 700 for appropriate visualization of the bio-feedback devices and the conductive wiring 712.

Figure 18B:
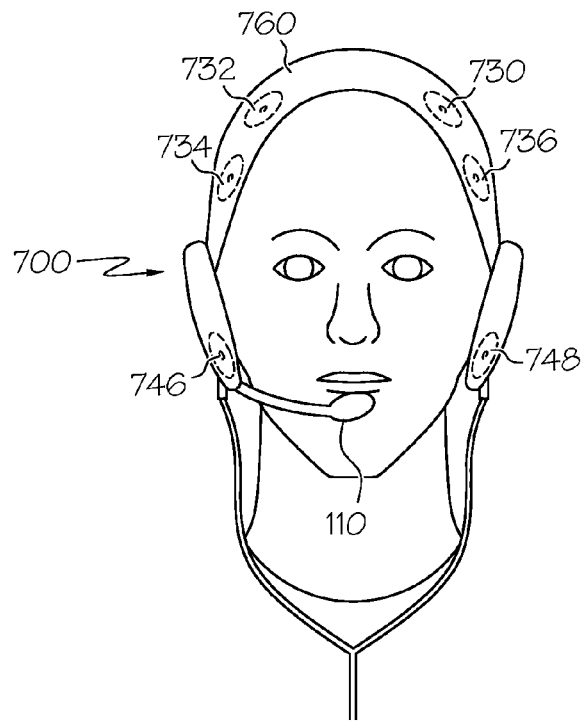
FIG. 18B illustrates an embodiment of a bio-feedback headset.
Figure 19:
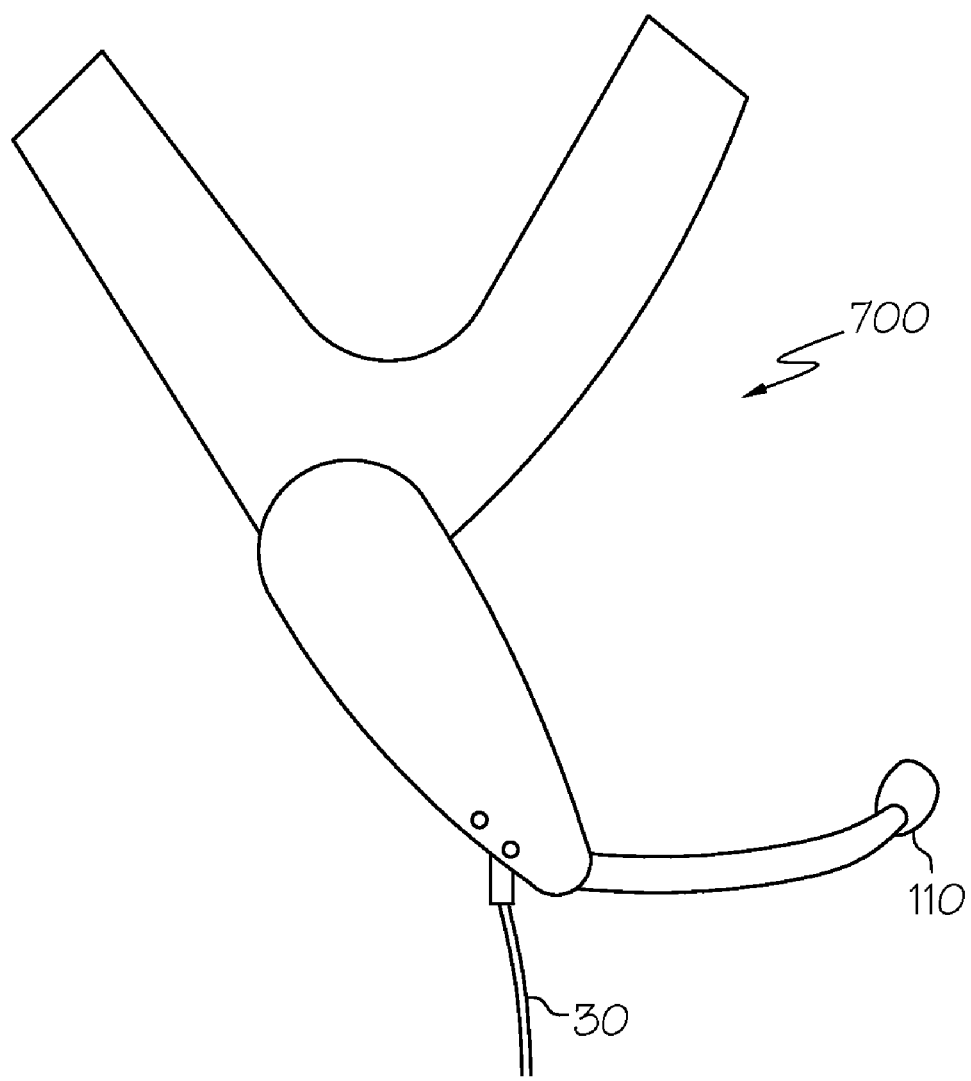
FIG. 19 illustrates a side view of an embodiment of a bio-feedback headset.

Generally, the bio-feedback devices are positioned within the headset at orientations appropriate for attaining physical communication with the skin of the participant's head and for monitoring physiological data. As shown in FIGS. 18A and 18B, there may be frontal electrodes 730, 732 that are positioned in areas corresponding with the frontal lobe of the participant; temporal frontal electrodes 734, 736 that correspond with the temporal frontal region; temporal parietal electrodes 738, 740 that correspond with the temporal parietal region; occipital parietal electrodes 742, 744 that correspond with the occipital parietal region; and mandibular electrodes 746, 748 that correspond with the mandible. It is contemplated that bio-feedback devices may be oriented in a variety of other positions about the head of the participant according to what physiological conditions are being monitored.

Figure 21:
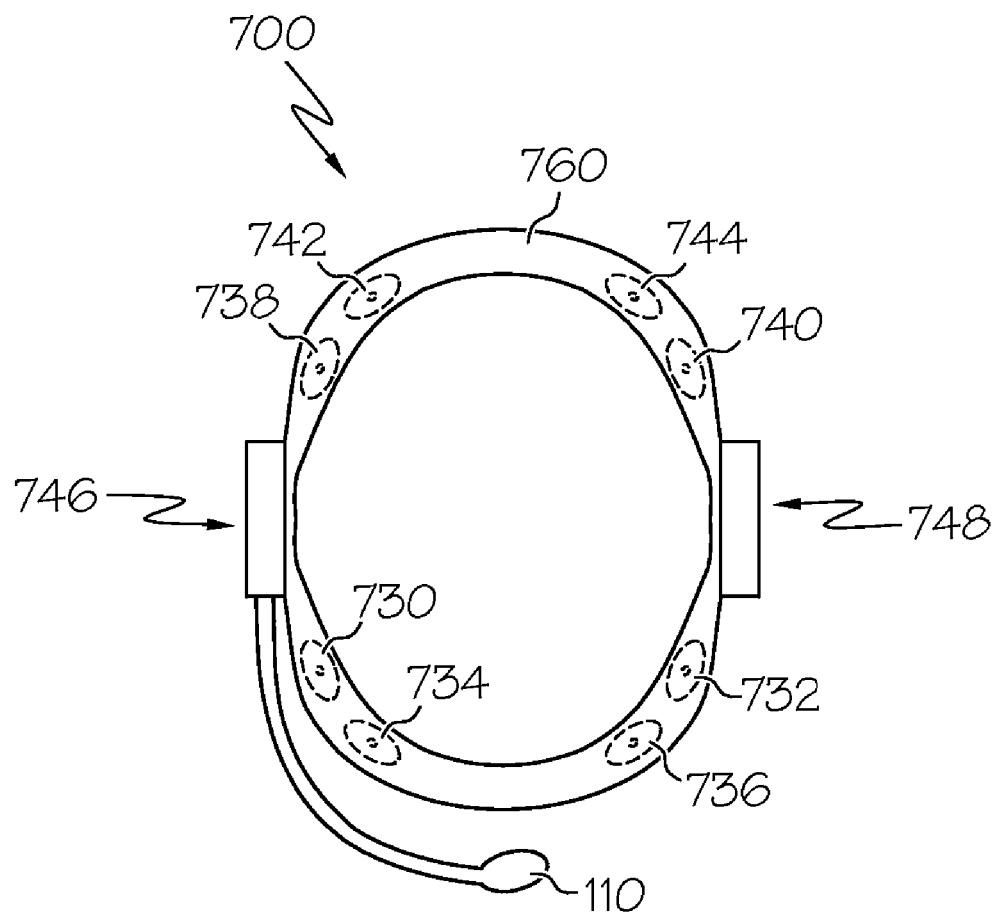
FIG. 21 illustrates a top view of an embodiment of a bio-feedback headset.

In the embodiment of a headset 700 as illustrated in FIGS. 18A and 21, the headset 700 includes eight EEG electrodes 730, 732, 734, 736, 738, 740, 742, and 744 positioned within the interior surface of the headset 700 such that when the headset 700 is worn by a participant, the eight EEG electrodes may monitor accurately the electrical activity of surface neurons (emitted in the form of EEG waves) from those respective areas of the participant's brain. The headset 700 also has two galvanic electrodes 746, 748, one positioned on each lateral side of the headset 700 such that the electrodes 746, 748 may come into physical communication with the mandible, as shown in FIGS. 18A and 18B. These galvanic electrodes 746, 748 may monitor the general skin conductivity, altered by perspiration, of the participant in the mandibular area. Further, the headset 700 has a polyvinylidine fluoride thermocouple 120 (shown in FIG. 20) that may monitor the respiratory rate of the participant. The headset 700 may transmit, via the conductive wiring 712 and the communication link 30, the EEG waves, the skin conductivity, and the respiratory rate to the video game system for processing into a form easily utilized by the software operated through the video game system. It is contemplated that additional and/or other bio-feedback devices may be incorporated into the headset 700 to monitor other physiological variables.

Similar to the ear piece 100 described above, the headset 700 may further comprise an ear piece comprising a speaker for transmitting audio from the video game system to the participant. In addition, the headset may comprise a microphone for transmitting verbal communication from the participant to the video game system. As shown in FIG. 20, the microphone 125 may be incorporated into a respiratory voice sensor 110 where the microphone 125 is adjacent to a thermocouple 120 for detecting respirations from the participant. This embodiment is described in greater detail above with respect to the ear piece 100.

In accordance with another embodiment, a video game system comprises a video game processor, a computer readable medium containing executable instructions for providing a video game, and a game controller. In accordance with another embodiment, a video game system includes a video game processor, a computer readable medium containing executable instructions for providing a video game, a game controller, and a headset. The video game system may further include a network connection for electrically coupling multiple video game systems such that participants of the multiple video game systems may engage in simultaneous, interactive game play through their respective video game systems.

With respect to an embodiment comprising both a controller and a headset, it is contemplated any arrangement of incorporation of bio-feedback devices into the controller and/or the headset may be provided. For example, but not by way of limitation, the controller may comprise multiple pulse-pressure detectors and a galvanometer, while the headset may comprise one or more EEG electrodes and a thermocouple. In an embodiment comprising both a controller and a headset, the controller and the headset may interact simultaneously with the video game system such that various forms of data, conventional, physiological, and otherwise, may be processed by the video game system at the same time.

Often computers communicate with each other and share information, invention, and/or services. Sometimes in this setting, the various computers are referred to as nodes, which is a generic term referring to access points in an interconnected system. One type of computer network employs a client-server architecture. The portions of network inventions that interact with participants typically are separated from the portions of network inventions that process requests and information. Often, the portions of an invention that interact with participants or access network resources are called client inventions or client software and portions of an invention that processes requests are called server inventions or server software. Client machines tend to run client software and server machines tend to run server software, however, a server can be a client as well.

In accordance with one embodiment, the video game system typically will be provided on a client machine, while the software containing the computer instruction that comprises the instructions to collect and measure the bio-feedback from the participant may be located on the client computer or the server computer, separate of the client machine. As used herein, "software" means a computer readable medium comprising executable instructions for providing a video game operable through a video game system, or component thereof.

Figure 8:
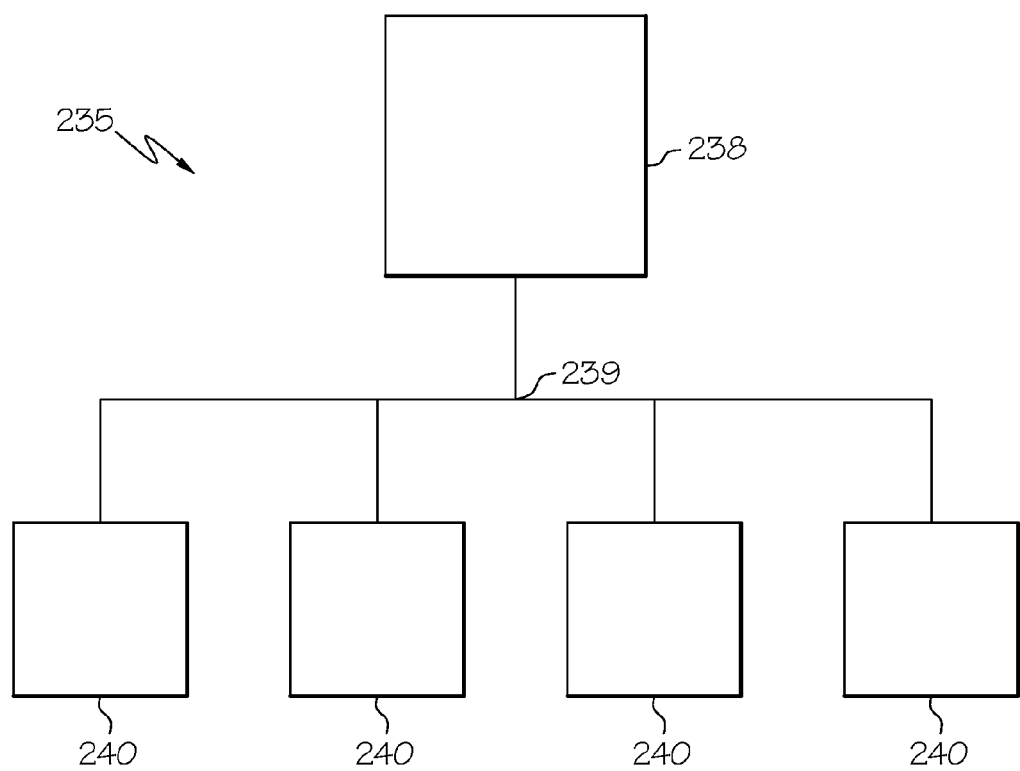
FIG. 8 illustrates an embodiment of a client server network.

FIG. 8 schematically illustrates a sample client-server network 235 that might be employed to implement an embodiment of the present invention. As one with ordinary skill in the art will readily appreciate, a client-server network is only one type of network and a variety of other configurations, such as peer-peer connections, are also considered networks that may be used with embodiments of the present invention. In a client-server network 235, a plurality of nodes are interconnected to various nodes that send and receive information to/from one another. As shown here, a server node 238 is interconnected with a plurality of client nodes 240 using a connection 239, such as a token ring, ethernet, telephone modem connection, radio or microwave connection, parallel cable, serial cables, telephone lines, universal serial bus "USB", Firewire, Bluetooth, fiber optics, infrared "IR", radio frequency "RF", and the like, or combinations thereof.

As one skilled in the art can appreciate, the video game system may be connected to other video game systems or servers that further process and/or distribute the bio-feedback information and similarly send instructions back to the video game system in order to respond to the bio-feedback measurements of the participant. Likewise, one skilled in the art will appreciate, an embodiment of a video game controller could act as a client computer itself and be connected through a communication link to a server node.

Figure 9A:
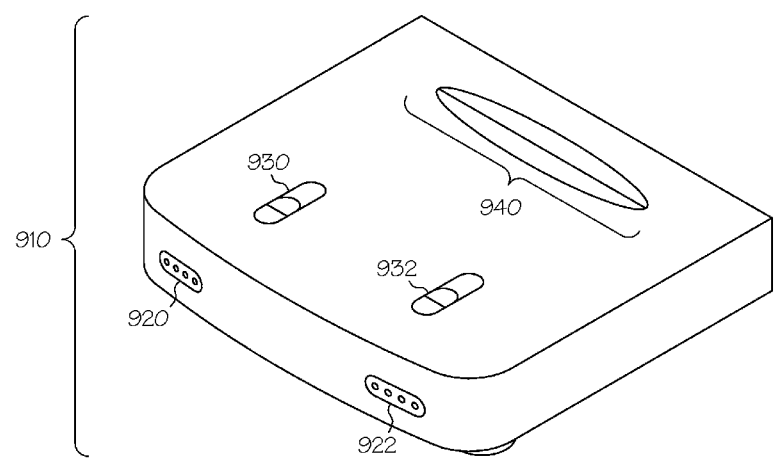
FIG. 9A illustrates an embodiment of a typical video game system known in the art.
Figure 9B:
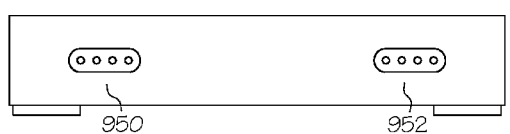
FIG. 9B illustrates a front view of an embodiment of a typical video game system known in the art.

The general structure of a control deck 910 of the video game system can be observed in FIG. 9. As one skilled in the art will appreciate, the structure may comprise a multitude of various arrangements. On the front panel, facing the viewer are two controller adapters 920, 922 that may interface with game controllers 20 and/or headsets 700 (such as those shown in FIG. 18A). It is contemplated that more than two controller adapters 920 may be incorporated into the front panel, or other area, of the control deck 910 so as to interface with multiple game controllers 20 and/or headsets 700, or combinations thereof. A game port 940 may be visualized on the top, rear of the control deck 910 that allows for the interface of the control deck 910 and the software. Also, on the top of the control deck 910 is an on/off switch 930 and a reset button 932 that interrupts the running of the software and returns to the beginning of the software program. As visible in FIG. 10, on the back of the control deck 910 is an A/C power supply port 950 that connects an outside power source to a circuit board of the control deck 910. Also, located on the back of the control deck 910 is a connector 952 that allows the processed data from the software to be transferred and displayed on a monitor via an audio/video cable.

Figure 10:
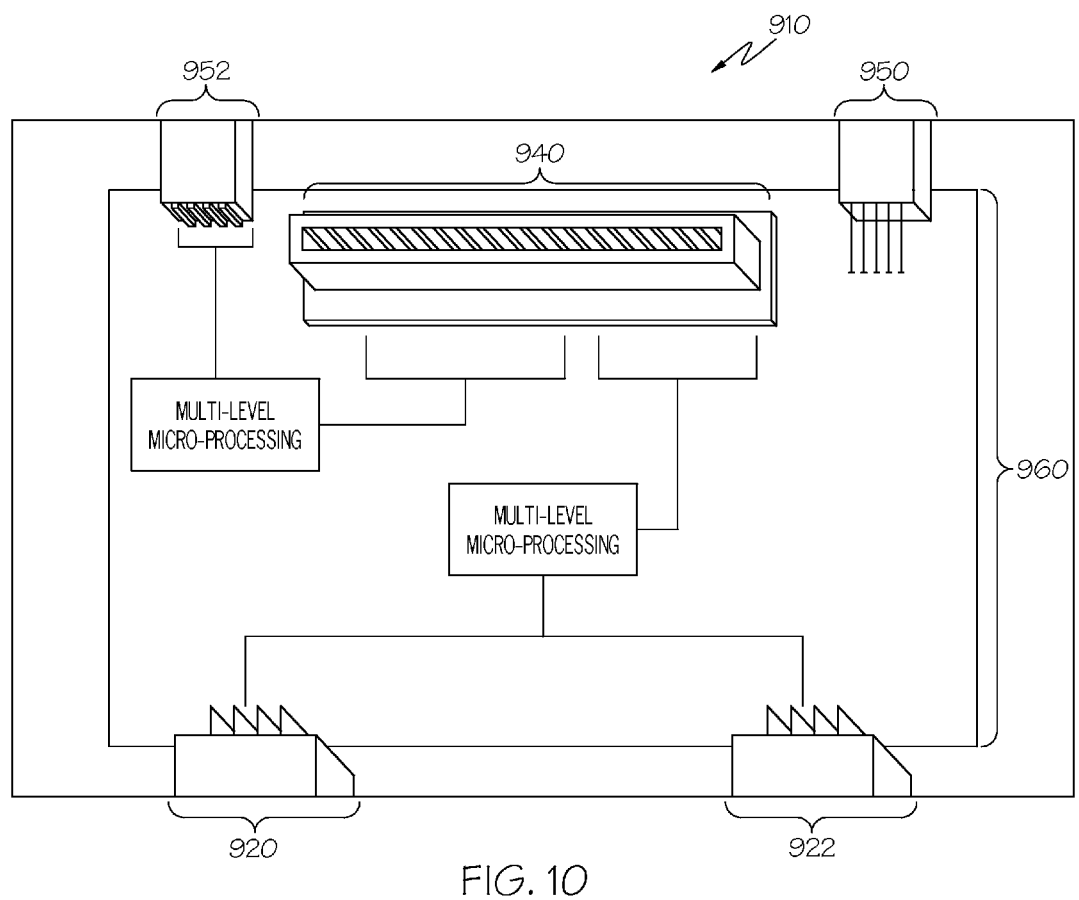
FIG. 10 illustrates an interior view of an embodiment of a video game system.

An inside view of the control deck 910 is depicted in FIG. 10. Positioned within the control deck 910 is a circuit board 960. Attached to the circuit board 960 on the front face are the controller adapters 920, 922 that interface with the controllers 20 and headsets 700 (such as those shown in FIG. 18A). Two distinct data types are sent to the circuit board 960 via the controllers 20 and headsets 700. The first is data resulting from the manual manipulation of the controller 20, which is also referred to herein as conventional controller data, that is inputted by the participant of the video game system. The second data type is the unprocessed physiological data that also is transmitted back to the circuit board 960. Both data types undergo multi-level micro-processing, separately, on the circuit board 960 where that processed data eventually is transmitted to the software. One skilled in the art will appreciate that the physiological data and the conventional controller data may be processed together. The port 940 for interface between the software and the circuit board 960 can be visualized on the back of the circuit board 960. The data may be stored and accessed by the software and incorporated into the program in real-time, after which the output is sent back to the circuit board 960 where it is further processed and delivered to a display device, such as a video monitor, via the connector port 952. The A/C current is delivered to the circuit board 960 via the A/C power supply port 950 located on the rear of the circuit board 960.

Figure 11:
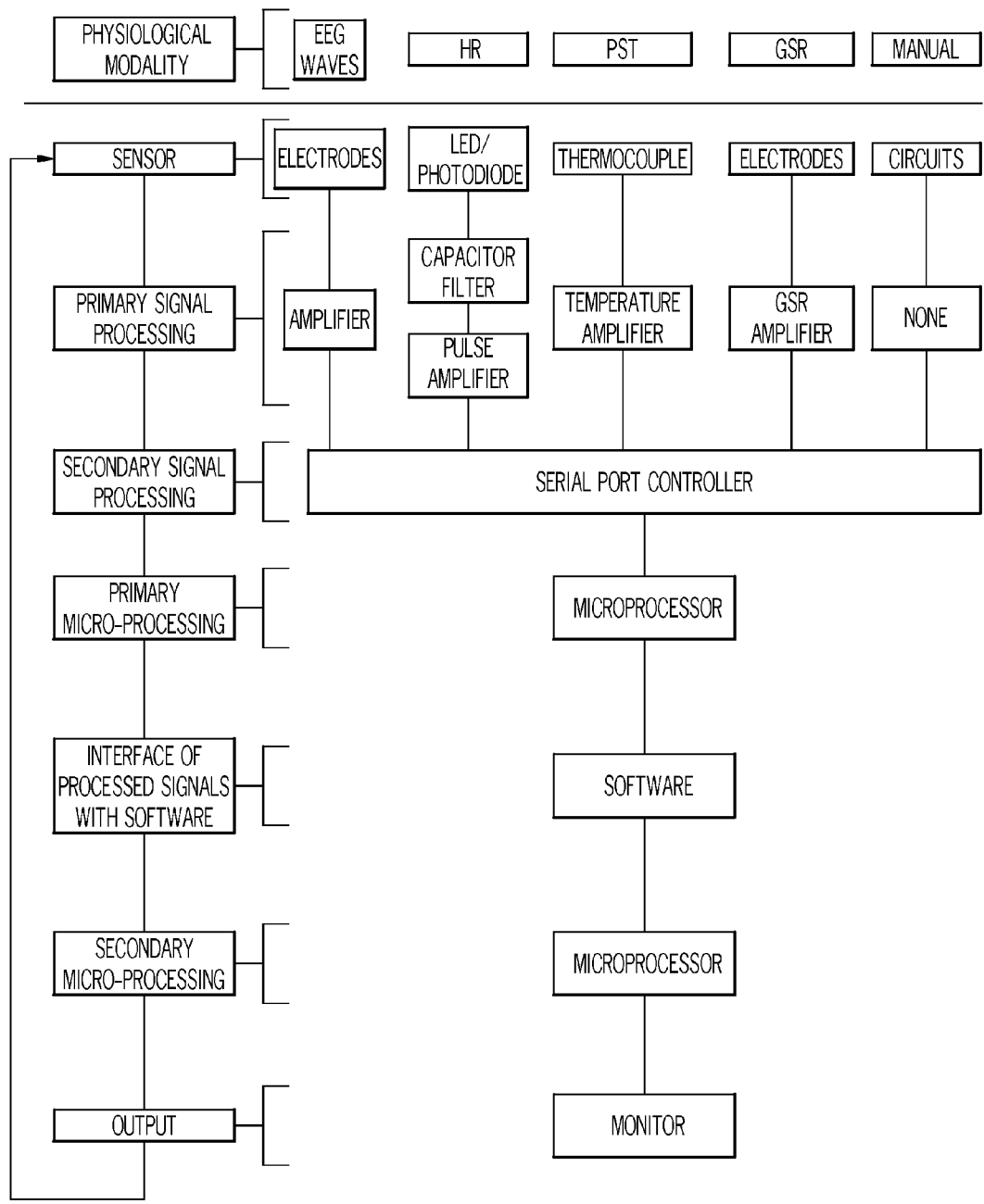
FIG. 11 illustrates exemplary components of an embodiment of a video game system.

FIG. 11 details an embodiment illustrating a progression of signals as they are processed in a video game system. The game controller 20 and the headset 700 (as shown in FIG. 18A) have the ability, through internal circuitry and electrical impulses, to monitor various phenomena including, but not limited to, GSR (electrodes), temperature (thermocouple), heart rate (LED/photoreceptor), and EEG waves (EEG electrodes) (specific to the headset) of the participant as well as the conventional controller data inputted by the participant. This raw physiological data generally undergoes a primary processing. For example, in monitoring a participant's heart rate, the signal received back from the photodiode first can be high pass filtered to remove high frequency elements from the signal and, then, is amplified, in one embodiment, using a three stage operational amplifier. Another example is in monitoring a participant's GSR and temperature, where the initial signal transmitted across the electrodes can be amplified using a GSR and temperature signal amplifier, respectively. The processing of signals are commonplace and known to one skilled in the art.

In the embodiment shown in FIG. 11, four physiological variables are addressed. As alluded to before, a multitude of physiological variables can be obtained through the controller 20 and the headset 700 including, but not limited to, respiration rate (LED/photoreceptor or polyvinylidine fluoride thermocouple), blood volume pulse (LED/photoreceptor), digital arterial pressure (LED/photoreceptor with cuff and servo control mechanism), P-R interval (four silver electrode system), and EEG waves (EEG electrodes). The physiological data transmitted to the video game system typically undergoes unique and separate primary processing, but subsequent transformations are identical to the processing modalities discussed above. Conventional controller data generally does not undergo primary processing.

Figure 22:
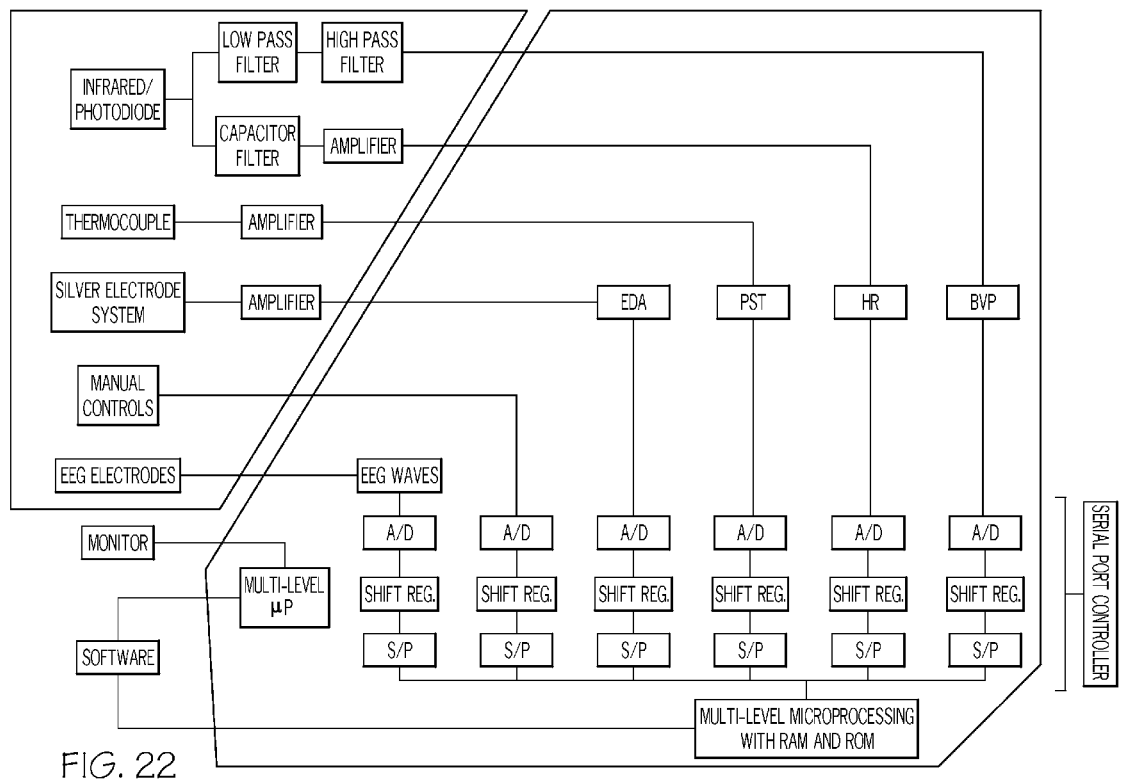
FIG. 22 illustrates exemplary components of an embodiment of a video game system.

Primary processing may occur in the controller 20, in the control deck 910 of the video game system, or elsewhere depending on the particular embodiment of the invention. As shown in FIG. 22, all data, including the conventional controller data, undergoes secondary processing at a serial port controller. The function of this serial port is to sync the data together and to transform the synced data into forms easily recognized by a computer. Thereafter, the data is converted from analog to digital form. The digitized data is then delivered to shift registers that pass the data to a serial to parallel converter. Once in digital, parallel form, the data has completed secondary processing and is transmitted to a data bus for primary micro-processing.

The processed EEG data stream may require further processing, different than that of the other physiological variables, after being converted to digital form by the microprocessor. The control deck may comprise a program configured to analyze the processed EEG data by analyzing the characteristics and frequency of the types of waves present. For example, Attention Deficit Hyperactivity Disorder has been associated with increased theta waves on EEG. Programs could be incorporated into the control deck that measure the number and amplitude of theta waves over a time period and convert the data into mean values and then the specific data points into "z" values. Exemplary embodiments of utilizing this approach are referred to in Horowitz (Alternative and Complementary Therapies, December 2006, pp. 275-281) and Loo et al. (Applied Neuropsychology, 2005, Vol. 12, No. 12, 64-76). The software could then utilize these "z" values to incorporate the participant's ability to alter the number and amplitude of theta waves present into outcomes of the game in real-time, as is described herein with other physiological variables. It is contemplated, however, that other devices, programs, or methods may be utilized to further process the EEG data into a meaningful form that can easily be utilized by the video game system and the software operated thereon as one skilled in the art can readily appreciate that multiple combinations and permutations of information can be obtained from the complex waveforms of EEG's.

In accordance with one embodiment, the microprocessor transmits the data to a ROM unit that stores the processed data. Then, a RAM unit accesses the data stored in the ROM unit and calculates a mean, standard deviation, running mean, running standard deviation, and a "z" value. The "z" value represents the number of standard deviations the physiological data $x_i$, is away from the running mean on a second to second basis. The "z" values from all the separate physiological variables are transmitted to shift registers and the streams of data are converted from serial to parallel form. The parallel data is then transmitted to a data bus that transmits the data to the software to be stored and read. The result is a multi-level micro-processing system that collects the streams of physiological data and sends the data in a form that can be easily utilized by the software.

The conventional controller data is processed in a manner similar to that of the physiological data, without the primary processing described above. Here, the conventional controller data is transmitted to the circuit board in the control deck of the video game system. The conventional controller data then bypasses the primary processing of the physiological data and proceeds to the serial port where the conventional controller data is converted from analog to digital form. Thereafter, the digitized conventional controller data is converted into serial form by shift registers and later converted to parallel form. This procedure is well documented in the art of video game manufacturing and well known to one skilled in the art. Next, the digital, parallel form conventional controller data is transmitted to a distinct multi-level micro-processing unit and then transmitted to the ROM to be stored and read. The conventional controller data is processed separately from the physiological data of the controller and the headset.

In accordance with one embodiment, two types of data are transmitted to the software: the processed conventional controller data and the processed physiological data. The software is able to respond to both types of data during the progression of the game provided by the software that is operated on the video game system. After integrating the two types of data into game play, the software transmits output in response to the two types of processed data to the control deck where the software output undergoes multi-level processing before it is sent to a video monitor for viewing by the participant operating the video game system.

Figure 12:
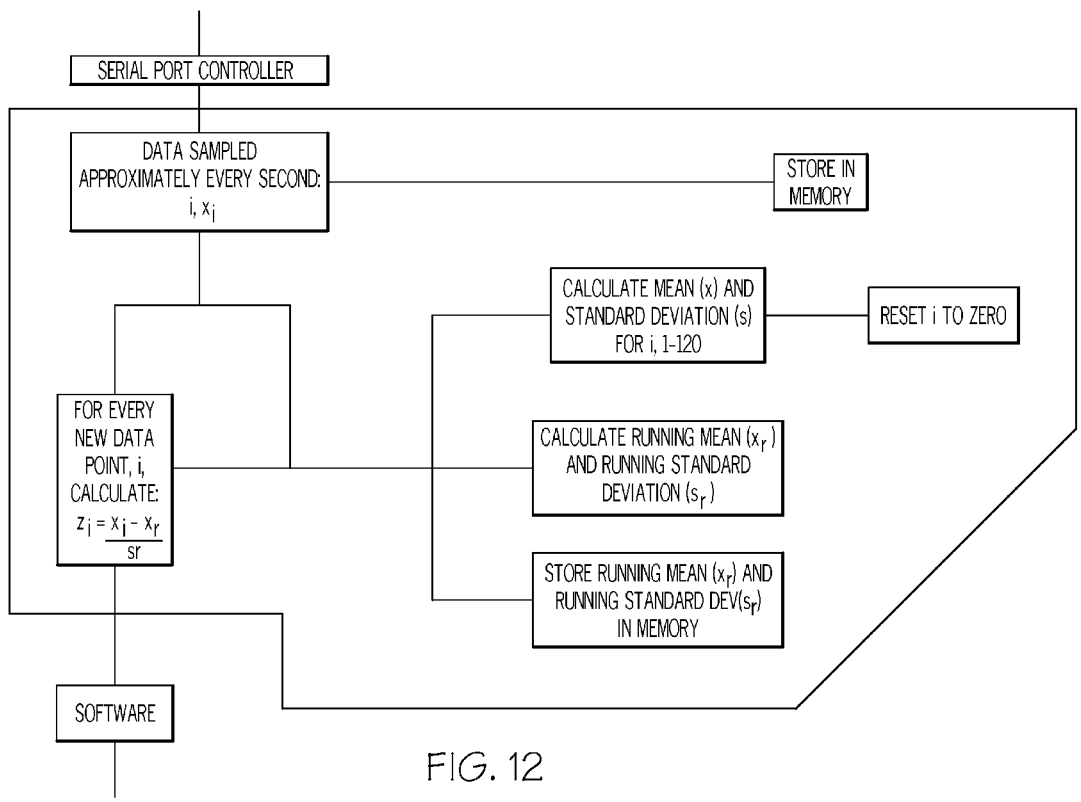
FIG. 12 is a flow chart depicting an exemplary set of executable instructions of an embodiment of a video game system.

FIG. 12 illustrates an exemplary set of executable instructions for the primary micro-processing in accordance with one embodiment. The micro-processing processes physiological data and transmits it to the software so that the software can react to the ability of the participant to alter his physiology based on changes in the participant's physiological variables. In one embodiment, the primary microprocessor has RAM and ROM capability so that it may not only store incoming physiological data streams, but it also may perform mathematical transformations of such streams. FIG. 12 is an example of one such transformation. In this particular embodiment, all physiological data (in digital/parallel form) is sampled approximately every second. This sample of data initially is stored in memory. The first 120 seconds serve as an initialization period. While the physiological data is being transmitted and stored, no calculations are made of data specific each physiological variable. After the first 120 seconds pass, a mean and standard deviation are calculated. In the subsequent 120 seconds, these values will represent the running means and running standard deviations and will be utilized to calculate "z" values for their respective physiological variable. So each physiological variable, such as heart rate, will have a unique running mean and running standard deviation. The "z" value calculated for heart rate, for example, will be delivered to the software as a stream along with "z" values for other physiological variables being monitored.

After the second time period of 120 seconds has passed, a new mean and standard deviation will be calculated for the second time span. The result will be averaged into the running mean and running standard deviation to update these values and the new running mean and running standard deviation will be used to calculate "z" values for the next 120 seconds. The running mean and running standard deviation is updated on a continual basis every 120 seconds as long as game play continues uninterrupted. The "z" values for each of the physiological variables are transmitted continuously to the software, which is referred to as the signal/software interface in FIG. 11.

The components of the video game system (i.e., circuit boards, power supply, RAM and ROM, display adapter, etc.) are easily obtainable by one of ordinary skill in the art. The circuit board in one exemplary embodiment comprises a microprocessor, which may comprise executable instructions.

Figure 13A:
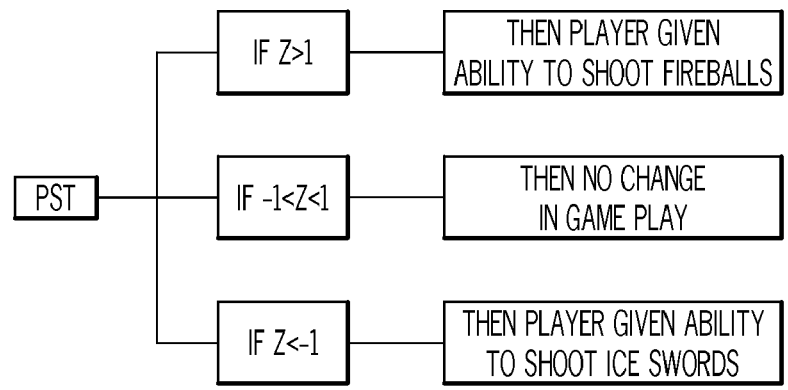
FIG. 13A depicts exemplary utilization of data processed by an embodiment of a video game system.
Figure 13B:
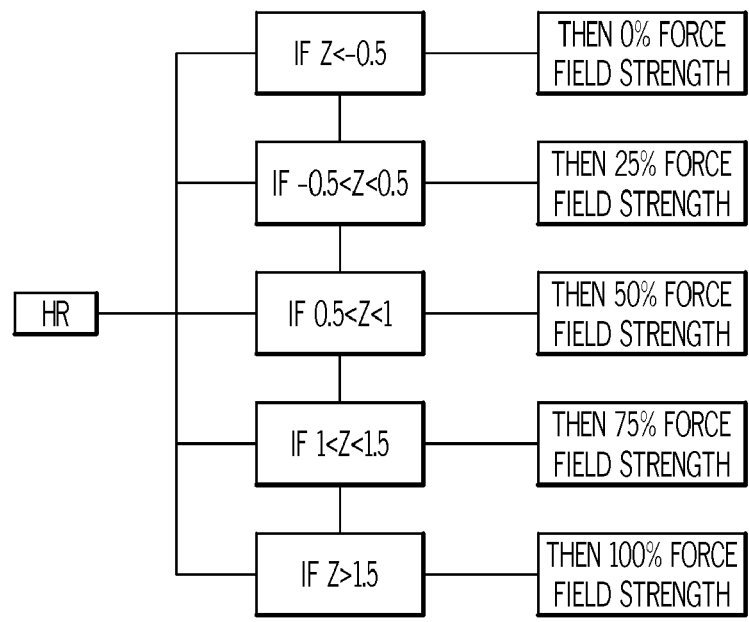
FIG. 13B depicts exemplary utilization of data processed by an embodiment of a video game system.

An example of how a software programmer may utilize the incoming streams of "z"-values is depicted in FIG. 13. The programmer is able to utilize processed physiological data to incorporate outcomes within the game based on the participant's then current physiological variables and the participant's ability to modify those physiological variables being monitored by the video game system. The programmer may incorporate the physiological data into game play using the participant's degree of success so that the outcome in the game depends on how well the participant is able to alter his physiology. Alternatively, the programmer may use arbitrary cutoff values for the physiological variables in devising all-or-nothing outcomes for the game.

In the embodiment shown in FIG. 13, specific examples of how a software programmer may utilize processed physiological data in the video game system to enhance game play are depicted. A hypothetical case is provided to better explain the capabilities and features of this video game system using a participant's physiological conditions to alter the scenarios or outcomes of a game. In accordance with one embodiment, a participant turns on a monitor and a video game system. The participant inserts a fantasy game into the control deck and, as instructed, places a headset on his head and places his hands around the controller, inserting his second and third digits into the retention rings. The controller is equipped with a thermocouple, a silver electrode system, and a LED/photoreceptor to measure peripheral skin temperature (PST), galvanic skin resistance (GSR), and heart rate, respectively, while the headset comprises one or more EEG electrodes to monitor EEG waves. The PST, GSR, heart rate, and EEG waves are transmitted and processed as described above and as illustrated in FIGS. 11 & 12. After 120 seconds of initialization, "z" values are calculated for each physiological variable on a second to second basis and transmitted to the software.

Following the initialization period, the participant starts off on a journey through a fantasy world of dragons and sorcerers. Since, the "z" values are updated and transmitted continuously to the software, the software programmer may utilize the ability of the participant to alter his physiological variables to change outcomes of the game. For example, as illustrated in FIG. 13, if the "z" values for PST becomes greater than one (change in temperature recorded from a hand or finger of the participant greater than one standard deviation over running mean), the software programmer may provide the participant with the ability to shoot fireballs. If the values for "z" are $-1<"z"<1$, the programmer may provide the participant with no change in game play. If $"z"<-1$ (change in temperature less than one standard deviation below running mean), the programmer may allow the participant the ability to shoot ice swords. Another example may allow for change in game play based on the ability of the participant to modify his monitored heart rate. If $"z">0.5$, then the programmer may program that there is no change in game play for the participant. If, however, $-0.5<"z"<0.5$ for heart rate, the programmer may provide the participant with a force field strength of 25%; if $-1<"z"<-0.5$, then the programmer may provide the participant with a 50% force field strength; if $-1.5<"z"<-1$, then the programmer may provide the participant with a 75% force field strength; and if $"z"<-1.5$, then the programmer may provide the participant with a 100% force field strength. One skilled in the art could conceive of a program designed specifically to create a continuum of effects over a range of "z" values. These scenarios are provided by way of example only and it is contemplated that different ranges, values of "z" may translate into any variety of features or changes in game play.

Figure 14:
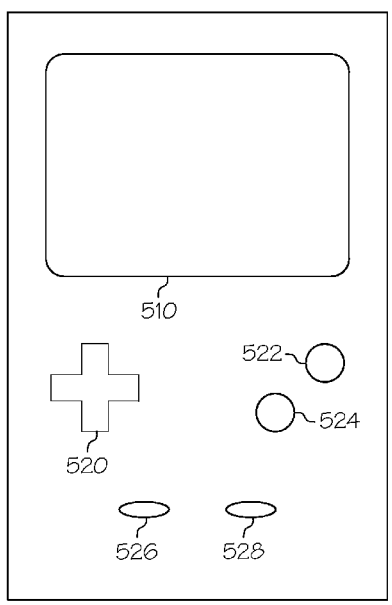
FIG. 14 illustrates an embodiment of a typical handheld video game system known in the art.
Figure 15:
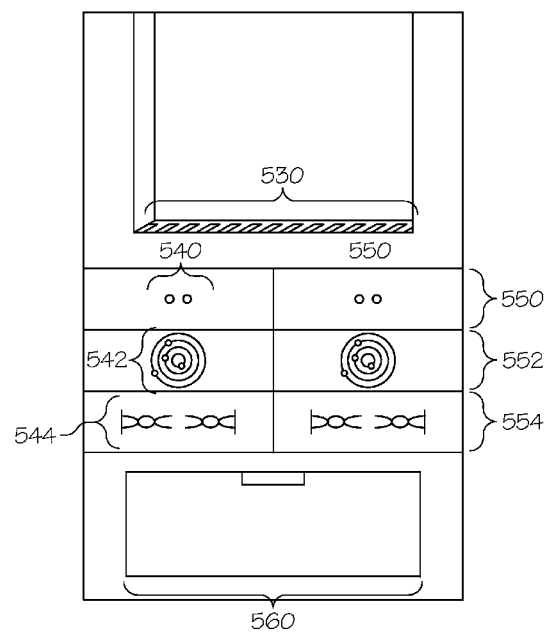
FIG. 15 illustrates a back view of an embodiment of a handheld video game system.

In accordance with another embodiment, a handheld video game system is depicted in FIGS. 14 and 15. FIG. 14 illustrates a front view of a handheld video game system. A directional keypad 520 is located adjacent to function buttons A & B 522, 524. A select game button 526 and a start button 528 also are depicted in FIG. 14. FIG. 15 depicts a back view of a handheld video game system. As shown in FIG. 15, a game port 530 may be provided on the back of the handheld game system. Generally, three finger wells 550, 552, 554 are provided beneath the game port on the back of the handheld game system. It is contemplated that there may be more or less than three finger wells 550, 552, 554 provided to the shell of the handheld game system. The three or more basic sensors for monitoring physiological variables are located within the wells. The finger wells generally are configured to ensure contact between the sensors of the wells and the $2^{nd}$, $3^{rd}$, and $4^{th}$ fingers of the participant. Each sensor may monitor a different physiological condition in each finger. For example, FIG. 15 illustrates an LED/photodiode 540 unit in the first well 550. As described above, the LED/photodiode 540 may monitor blood volume pulse, peripheral pulse, and respiration. A silver four electrode unit 542 is illustrated in the second well 552. This silver four electrode unit may monitor GSR and a one-lead ECG. The third well 554 may comprise a thermocouple 544. The thermocouple 544 may monitor peripheral skin temperature. A compartment 560, also shown in FIG. 15, allows for utilization of a portable power source, such as batteries.

In accordance with another embodiment, a handheld video game system includes a shell, a video display, a game port, a processor, and one or more bio-feedback devices for transmitting to the processor physiological data of a participant of the handheld video game system, wherein the bio-feedback devices are incorporated into the shell of the handheld video game system and into a headset electrically coupled with the handheld video game system. The headset may have one or more bio-feedback devices comprising at least one of an EEG electrode, a galvanometer, or a thermocouple, while the bio-feedback devices incorporated into the shell of the handheld video game system comprise at least one of a photoelectric plethysmography, a galvanometer, or a thermocouple. It is contemplated that additional or other bio-feedback devices may be incorporated into the shell and/or the headset. The handheld video game system may further comprise a network connection for electrically coupling multiple handheld video game systems such that participants of the multiple handheld video game systems may engage in simultaneous, interactive game play through their respective handheld video game systems.

Figure 16:
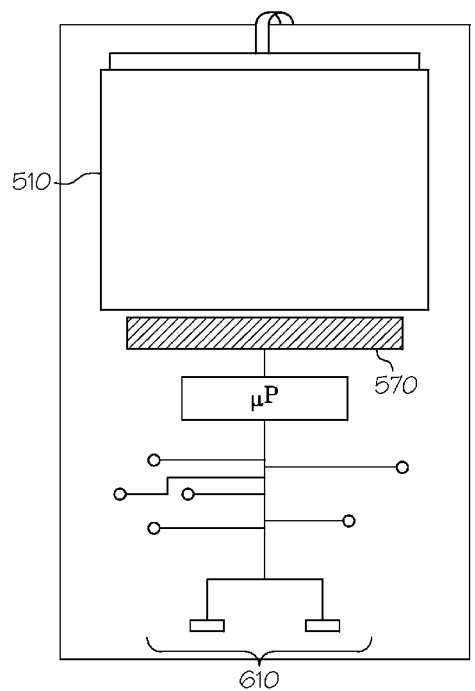
FIG. 16 illustrates a front view of an exemplary circuit board of an embodiment of a handheld video game system.
Figure 17:
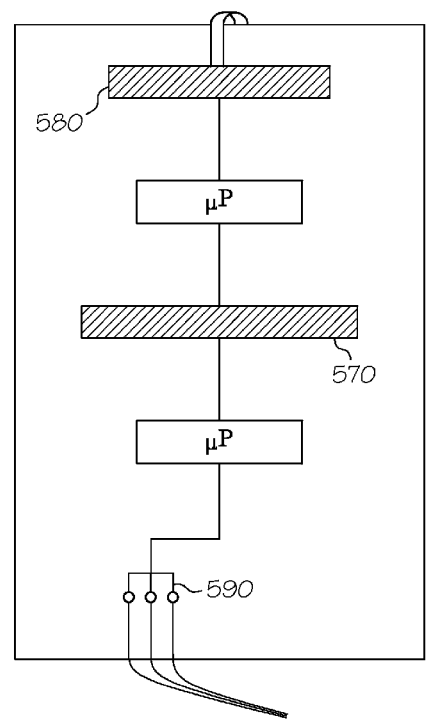
FIG. 17 illustrates a back view of an exemplary circuit board of an embodiment of a handheld video game system.

FIGS. 16 and 17 illustrate an embodiment of a circuit board for a handheld video game system. As shown in FIG. 16, a video display 510 may be attached to the top of the circuit board. The physiological data monitored by the sensors in the finger wells and the EEG electrodes, and/or other bio-feedback devices, in the headset generally is transmitted unprocessed back to the circuit board 590, but as one skilled in the art can appreciate, primary processing could also occur in the controller. At the circuit board, the physiological data undergoes multi-level processing before being transmitted, in processed form, to the software via the software-circuit board interface 570. In accordance with one embodiment, the multi-level processing may be the same as that described above with respect to the video game system. Once the processed physiological data is transmitted to the software, it may be stored so that it can be accessed at a later time. The data resulting from the manual manipulation of the buttons and the keypad of the handheld video game system also may be relayed back to the circuit board 610 where this data may undergo its own unique multi-level processing before it being transmitted to the software-circuit board interface 570. Once delivered to the software, the manual manipulation data also may be stored for later use. Both types of processed data, physiological and manual manipulation, are stored and accessed by the software and incorporated into the video game program provided by the software in real-time. The output from the software then may be sent back to the circuit board where it is further processed and delivered to the video display.

It is noted that recitations herein of a component of the present invention being "configured" to embody a particular property, function in a particular manner, etc., are structural recitations, as opposed to recitations of intended use. More specifically, the references herein to the manner in which a component is "configured" denotes an existing physical condition of the component and, as such, is to be taken as a definite recitation of the structural characteristics of the component.

It is noted that terms like "generally," "commonly," and "typically" are not utilized herein to limit the scope of the embodiments of the claimed invention or to imply that certain features are critical, essential, or even important to the structure or function of the claimed invention. Rather, these terms are merely intended to highlight alternative or additional features that may or may not be utilized in a particular embodiment.

The foregoing description of the various embodiments and principles of the present application has been presented for the purposes of illustration and description. It is not intended to be exhaustive or to limit the invention to the precise forms disclosed. Many alternatives, modifications, and variations will be apparent to those skilled in the art. Moreover, although multiple inventive concepts have been presented, such aspects need not be utilized in combination, and various combinations of the inventive aspects are possible in light of the various embodiments provided above. Accordingly, the above description is intended to embrace all possible alternatives, modifications, combinations, and variations that have been discussed or suggested herein, as well as all others that fall within the principles, spirit, and broad scope of the invention as defined by the claims.

What is claimed is:

1. A headset for use with a video game system, the headset comprising:
   a first bio-feedback device for transmitting to a video game system physiological data of a participant thereof comprising a respiratory voice sensor, wherein the respiratory voice sensor comprises a thermocouple;
   one or more second bio-feedback devices for transmitting to a video game system physiological data of a participant thereof, wherein the one or more second bio-feedback devices comprise at least one of an electroencephalogram electrode or a galvanometer;
   a communication link for electrically coupling the headset and the video game system; and
   conductive wiring for electrically coupling the first and second bio-feedback devices with the communication link.

2. The headset of claim 1, wherein the electroencephalogram electrode is configured to measure the electrical activity of surface cortical neurons emitted by a participant of the video game system.

3. The headset of claim 1, wherein the thermocouple comprises a polyvinylidine fluoride thermocouple.

4. The headset of claim 1, wherein the galvanometer comprises at least two conductors configured to measure a change in resistance of skin of a participant of the video game system, wherein the at least two conductors are in physical communication with the skin.

5. The headset of claim 1, wherein the headset further comprises:

an ear piece comprising a speaker for transmitting an audio component from the video game system to the participant; and a microphone for transmitting verbal communication from the participant to the video game system.

6. A video game system comprising:
a) a control deck;
b) a headset configured to transmit a first set of physiological data of a participant, wherein the headset is electrically coupled with the control deck; and
c) a controller configured to transmit conventional controller data inputted by the participant and a second set of physiological data of the participant, wherein the controller is electrically coupled with the control deck; and
wherein the control deck comprises:
a circuit board for directing the processing of the data transmitted by the headset and the controller;
an analog to digital converter electrically coupled with the circuit board;
a serial to parallel converter electrically coupled with the circuit board;
a software input module; and
a microprocessor electrically coupled with the circuit board and the software input module, wherein the microprocessor comprises executable instructions to alter game play of the video game based on the physiological data of the participant.

7. The video game system of claim 6, wherein:
the video game system further comprises software; and
the software is a computer readable medium comprising executable instructions for providing a video game operable through the control deck.

8. The video game system of claim 7, wherein the headset and the controller transmit data to the control deck for processing into a form interpreted by the software such that the processed data may alter the participant's game play of the video game.

9. The video game system of claim 6, wherein the headset comprises one or more bio-feedback devices comprising at least one of an electroencephalogram electrode, a galvanometer, or a respiratory voice sensor comprising a thermocouple.

10. The video game system of claim 9, wherein the headset further comprises:
a communication link for electrically coupling the headset and the control deck; and
conductive wiring for electrically coupling the bio-feedback devices with the communication link.

11. The video game system of claim 6, wherein the software input module is located on a client computer or a server computer.

12. The video game system of claim 6, wherein the video game system further comprises a network connection for electrically coupling multiple video game systems such that participants of the multiple video game systems may engage in simultaneous, interactive game play through their respective video game systems.

13. A video game system comprising:
a) a video game processor;
b) software;
c) a microprocessor electrically coupled with the video game processor; and
d) one or more bio-feedback devices electrically coupled with the microprocessor,
wherein the bio-feedback devices are incorporated into a headset or a video game controller, or both,
wherein the bio-feedback devices transmit data from at least two data types,
wherein the at least two data types comprise physiological data from a participant and conventional controller data inputted by the participant, and
wherein the microprocessor comprises executable instructions for dynamically determining a "z" value that represents the number of running standard deviations the physiological data is away from a calculated running mean of the physiological data; and wherein the executable instructions further comprises transmitting the "z" value dynamically to the video game processor; and wherein the video game processor comprises executable instructions for comparing the "z" value against predetermined "z" value thresholds and altering output of the video game based on such comparison.

14. The video game system of claim 13, wherein the video game system is a handheld video game system, the handheld video game system further comprises:
a shell;
a video display; and
a game port;
wherein the one or more bio-feedback devices are incorporated into the shell of the handheld video game system or a headset electrically coupled with the handheld video game system.

15. The video game system of claim 14, wherein the bio-feedback devices are incorporated into the shell of the handheld video game system and the headset electrically coupled with the handheld video game system.

16. The video game system of claim 14, wherein the headset comprises one or more bio-feedback devices comprising at least one of an electroencephalogram electrode, a galvanometer, or a respiratory voice sensor comprising a thermocouple.

17. The video game system of claim 14, wherein the bio-feedback devices incorporated into the shell of the handheld video game system comprise at least one of a photoelectric plethysmography, a galvanometer, or a respiratory voice sensor comprising a thermocouple.

18. The video game system of claim 14, wherein the handheld video game system further comprises a network connection for electrically coupling multiple handheld video game systems such that participants of the multiple handheld video game systems may engage in simultaneous, interactive game play through their respective handheld video game systems.

19. A method of providing physiological data of a participant of a video game system to a software input module of the video game system, wherein the method comprises:
a) receiving unprocessed physiological data through a bio-feedback device electrically coupled with the video gaming system, wherein the bio-feedback device transmits the unprocessed physiological data to the video game system;
b) converting the unprocessed physiological data from an analog form to a digital form;
c) collecting the digitally converted physiological data on a shift register, wherein the digitally converted physiological data is collected serially;
d) converting the serially collected digitally converted physiological data into parallel form;
e) delivering the parallel form of the digitally converted physiological data to parallel a data bus;
f) transferring the parallel form of the digitally converted physiological data on the parallel data bus to a microprocessor;
g) relaying the parallel form of the digitally converted physiological data to a ROM unit, wherein the ROM unit stores the parallel physiological data;

h) accessing the ROM unit utilizing a RAM unit to perform pre-defined calculations of the parallel form of the digitally converted physiological data;

i) dynamically calculating a "z" value for the parallel physiological data utilizing a running mean and running standard deviation of the parallel form of the digitally converted physiological data;

j) transferring the "z" value to a shift register in a serial manner;

k) converting the serial "z" value to a parallel form of the ""z"" value;

l) transferring the parallel form "z" value to a microprocessor; and m) relaying the parallel form "z" value from the microprocessor to the software input module.

20. The method of claim 19, wherein the relaying of the parallel form "z" value from the microprocessor to the software module is performed on a client computer or a server computer.

21. The method of claim 19, wherein the bio-feedback device is incorporated into a headset worn by the participant of the video game system.

* * * * *